United States Patent [19]

Pikel

[11] 4,166,836

[45] Sep. 4, 1979

[54] RENDERING APPARATUS

[75] Inventor: John H. Pikel, Oak Lawn, Ill.

[73] Assignee: Allegheny Ludlum Industries, Inc., Pittsburgh, Pa.

[21] Appl. No.: 845,438

[22] Filed: Oct. 25, 1977

Related U.S. Application Data

[63] Continuation of Ser. No. 720,407, Sep. 3, 1976, abandoned.

[51] Int. Cl.² .......................... B01D 43/00; C11B 1/16

[52] U.S. Cl. .................................... 422/308; 422/309; 422/202; 422/225

[58] Field of Search ............... 23/280, 290.5; 422/308, 422/309, 202, 225

[56] References Cited

U.S. PATENT DOCUMENTS

| | | | |
|---|---|---|---|
| 639,529 | 12/1899 | Cook | 23/290.5 X |
| 2,269,898 | 1/1942 | Anderson | 23/290.5 |
| 3,282,972 | 11/1966 | Merlis | 23/280 X |
| 3,412,671 | 11/1968 | Merlis | 23/280 X |
| 3,782,902 | 1/1974 | Madsen et al. | 23/280 |

*Primary Examiner*—Michael S. Marcus
*Attorney, Agent, or Firm*—Vincent G. Gioia; John K. Williamson

[57] ABSTRACT

The apparatus includes a plurality of elongated, vertically spaced and horizontally oriented chambers that are interconnected for the sequential flow therethrough of the material to be rendered. Each chamber has the material discharge, inlet, and product steam vents located in the chamber ends so that the chamber is heated along its entire length and has agitator means also extending along its entire length for an efficient heat transfer to the material and removal of the water vapor developed.

8 Claims, 7 Drawing Figures

RENDERING APPARATUS

This is a continuation of application Ser. No. 720,407 filed Sept. 3, 1976 now abandoned.

BACKGROUND OF THE INVENTION

1. Field of the Invention

This invention pertains generally to apparatus for rendering fat from animal material.

2. Description of the Prior Art

A conventional apparatus for the continuous rendering of fat from animal material utilizes a series of heated, vertically spaced and interconnected horizontal cylinders or tubes for the sequential flow therethrough of material to be rendered. One such apparatus is disclosed in U.S. Pat. No. 3,410,882 granted Nov. 12, 1968. However, no provision is shown therein for rendering under vacuum conditions. Inasmuch as substantial water vapor in the form of product steam is developed, the continuous removal thereof, aided by the vacuum, during the process is most desirable. Further, the vacuum prevents the oxidizing of the product fat because of the airfree environment. U.S. Pat. No. 3,782,902 granted Jan. 1, 1974, and assigned to assignee of subject application discloses an apparatus to accomplish this result. The standpipe arrangement disclosed in this patent preserves the vacuum condition in the apparatus.

While the above-noted apparatus shown in U.S. Pat. No. 3,782,902 has proved to be relatively efficient, nevertheless the output of the apparatus could be improved. Because of the size of each tube, which may be 24 inches O.D. and the need to provide for the mounting of the agitator shaft on the ends thereof, the inlet and discharge were made through the tube wall. Of necessity, this restricted the length of the steam jacket to a dimension short of the full length of the tube. Also the agitator member had to have a length short of the full length of the tube to avoid interference with the discharge and to allow provision for a gate or dam to control material flow through the tube. Further, venting of the product steam was also provided through the tube wall and preferably at the discharge end. As a consequence of the above construction, the capacity of each tube in rendering or cooking output and evaporation rate is unduly low.

SUMMARY OF THE INVENTION

Applicant, as a consequence, designed an apparatus that doubles the rendering output and evaporation rate without a similar increase in size. Specifically, Applicant increased each tube size from 24 inches O.D. to 36 inches O.D. for a five tube apparatus compared to a 6 tube apparatus of similar length, thus providing only 53% greater area. Further, and more importantly, Applicant relocated the material inlet and discharge of each chamber or tube to the ends thereof and also the product steam vents along with the agitator bearings. The steam jacket can now extend the full length of the tube along with the agitator member. Hence, the heat transfer to the material is substantially improved since the entire length of tube is now utilized.

Also important in achieving the noted capacity is a consideration of the agitator operation. In apparatus of this type, the material moves sequentially through the tubes generally propelled by the incoming material and gravity. However, some longitudinal impetus is given to the material by the later to be described agitator. The agitator includes a shaft extending longitudinally through the tube and has a plurality of paddle-like elements thereon that extend toward the inner circumference of the tube. Preferably the agitator is rotated at sufficient speed, which may be approximately 50 RPM, for the apparatus detailed to cause the material, which may cover the lower quarter of the tube at rest, to be thrown outwardly by centrifugal force against the inner circumference of the tube and moved around same in a spiral fashion to a discharge. Speeds of 72 and 88 RPM have also proven to be satisfactory. Besides providing a good heat transfer rate to the material, this clears a large portion of the tube for product steam venting. The action of the agitator on the steam, aided by the vacuum also causes the steam to move in a spiral fashion through the tube toward the steam vents which are preferably located at each end of the tube for efficient removal at low back pressure.

For needed efficient material flow between tubes via the discharge end of one tube to the inlet of a lower tube, Applicant designed an end discharge that has a lower opening and an upper, preferably curved opening in the direction of rotation of the agitator that is located offset from the tube vertical centerline to accommodate the material moving about the inner circumference of the tube as it approaches the discharge end. The material as it moves out this volute-like discharge falls into the inlet of the lower tube aligned with the discharge and similarly offset from its vertical centerlines for a straight through material flow. The vent for this inlet tube end is located on the opposite side of the centerline to avoid the incoming material. Preferably a dam or gate is located in the discharge to control the flow of material through the tube. An upper vent is also provided in each discharge end of the tube. Manifolds located at each tube end and connected to the vents later combine to conduct the product steam to a condenser.

Also a part of the apparatus is a standpipe connected to the discharge of the bottom tube to allow continuous rendering while maintaining the vacuum in the tubes. Suitable standpipe water sumps for each manifold collect solid residue carry over and provide vacuum and pressure reliefs. Preferably the material is also initially introduced into the top tube of the apparatus in an air free condition by a piston pump feed.

It is, therefore, an object of this invention to provide a new and improved apparatus for rendering animal material.

Another object of this invention is to provide an apparatus having a plurality of tubes wherein the entire length of the tubes is utilized for an improved heat transfer to the material and the tube ends for the material transfer and the removal of product steam.

DESCRIPTION OF THE PREFERRED EMBODIMENT

Figure 1:
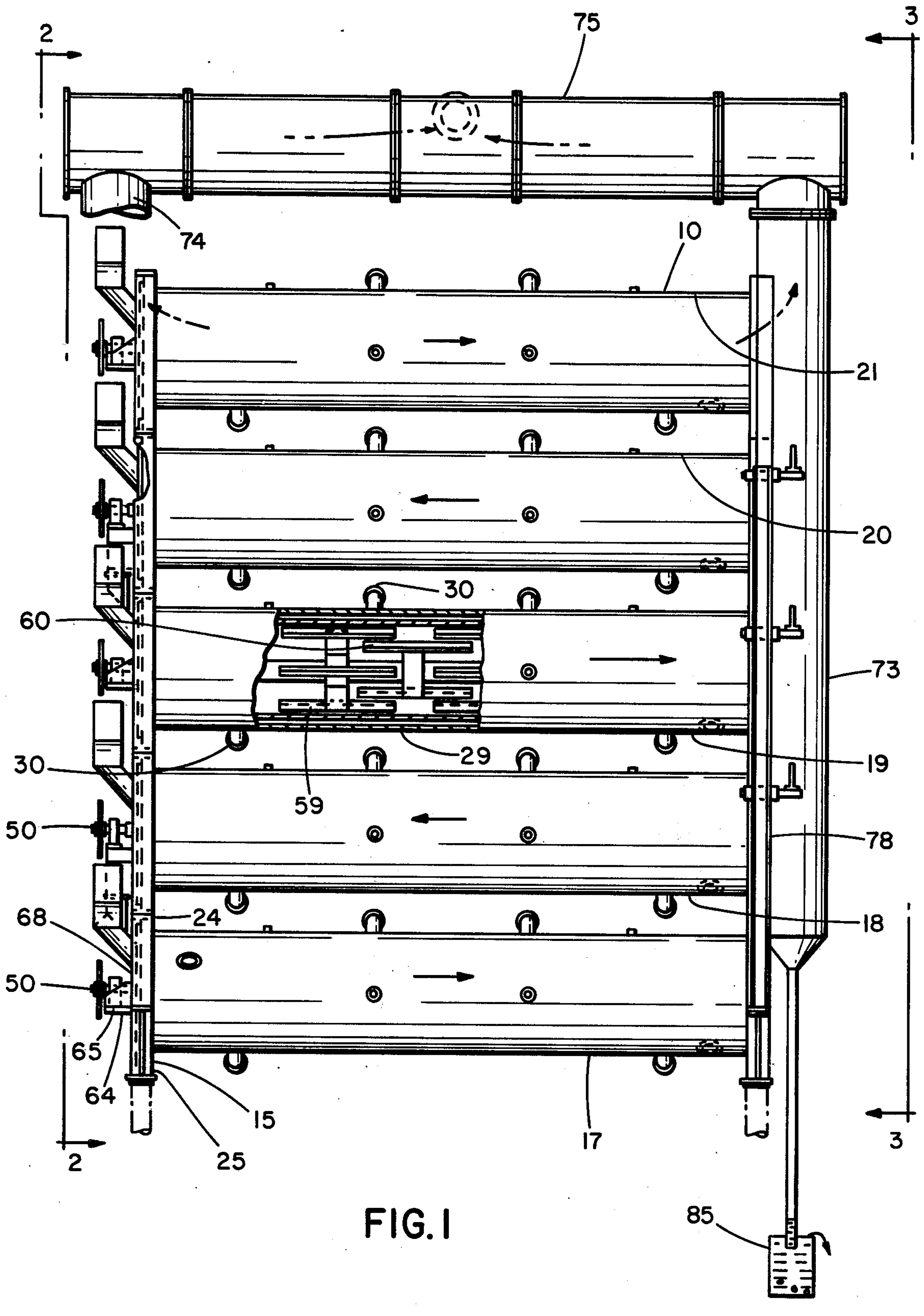
FIG. 1 is a front elevation (partially schematic) with portions cut away of the rendering apparatus of this invention.

Referring to FIGS. 1-3, 10 indicates the rendering apparatus of this invention. Apparatus 10 includes a pair of similar lower supports 11 which consist of steel plates welded together to form a base for the apparatus. Specifically, a support 11 includes bottom plate 12 and upper plate 14 with vertical reinforcing plates therebetween. Mounted on the upper side of bottom plate 12 is generally rectangular reinforcement 15 for the chambers or tubes of the apparatus. Reinforcement 15 which is the same for both ends of lower tube 17 and the other vertically spaced and generally horizontally oriented tubes or cylinders 18, 19, 20 and 21 of the apparatus, includes end plate 23 welded to and surrounding the end of each tube. Also welded to end plate 23 and shown best in FIG. 4 are narrow upper and lower bars 24 and 25 which with the side bars 26 and 27 provide a box-like support structure at each end of the tube. Via suitable fasteners in the upper and lower bars 24 and 25, each tube is fastened to another and thus vertically supported to form the apparatus starting from its base support 11.

Surrounding each tube of the apparatus is a steam jacket 29 that extends between the end plates 23. Suitable pipes 30 having attached flanges provide steam communication with jacket 29 to thus heat each tube wherein the internal temperature may vary between the tubes from approximately 180° F. to 280° F. for the apparatus 10. The steam may vary from 110 P.S.I. and 320° F. to 150 P.S.I. and 365° F. and somewhat higher.

Figure 2:
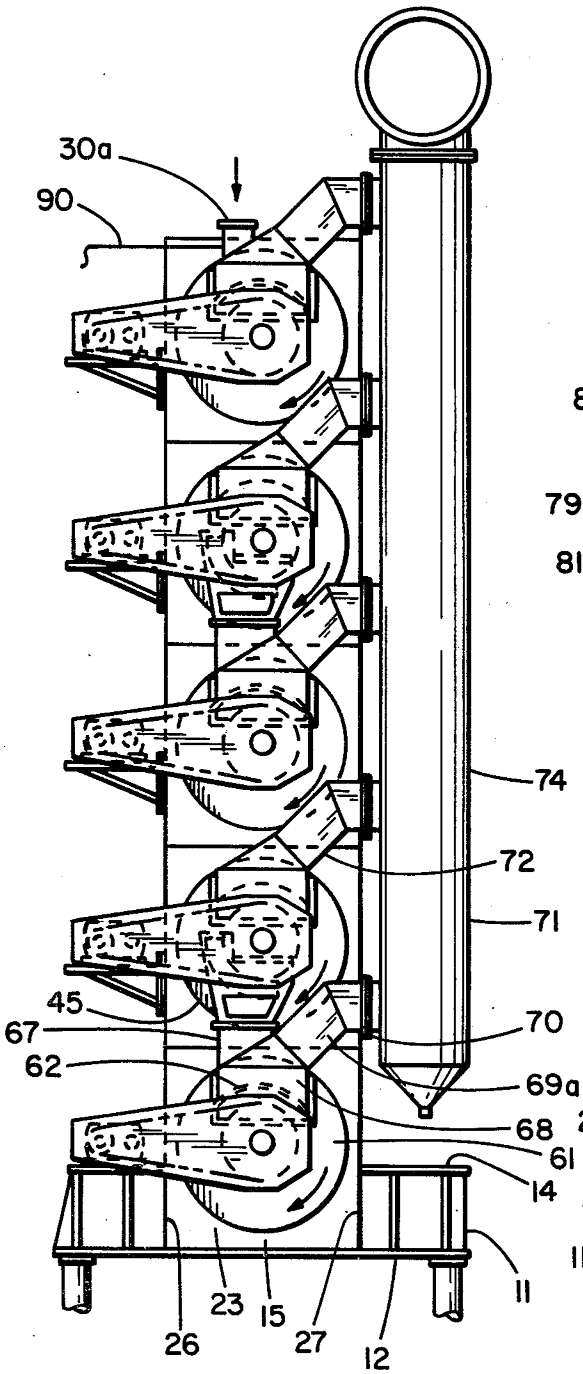
FIG. 2 is a side view taken along line 2—2 of FIG. 1.

As shown best in FIGS. 1 and 2, the material to be rendered is introduced into the apparatus 10, in an air free state by preferably a piston type pump at flanged opening 30*a* at the left end of top tube 21. The material flow is in the general direction of solid line arrows through tube 21 into tube 20 below and hence, the length of tube 20 and down through the apparatus with eventual discharge at the discharge end of tube 17. As noted previously, the actual material flow is in a spiral fashion through each tube because of the agitation. A suitable air lock at the discharge end of tube 17, which may be a stand pipe, is required to maintain the vacuum, which may be 6–10 inches of $H_2O$ in the tubes.

Because of the sequential movement of the material through the tubes, varying end covers defining end walls are provided. As shown generally in FIGS. 1 and 2, each tube has a discharge end and an inlet end which oppose each other. Since the tubes are identical, as are the discharge ends except for hand, the discharge end of tube 18 will be described along with the adjacent inlet end of tube 17 associated therewith as shown in FIG. 4. It is to be noted that the covers selected depend upon the later to be described agitator rotation and vent connections to the manifolds. As noted in FIG. 2, by the arrows, the rotation is clockwise for each tube with each agitator being driven by independent drives at approximately 50 R.P.M. for the apparatus described.

Figure 4:
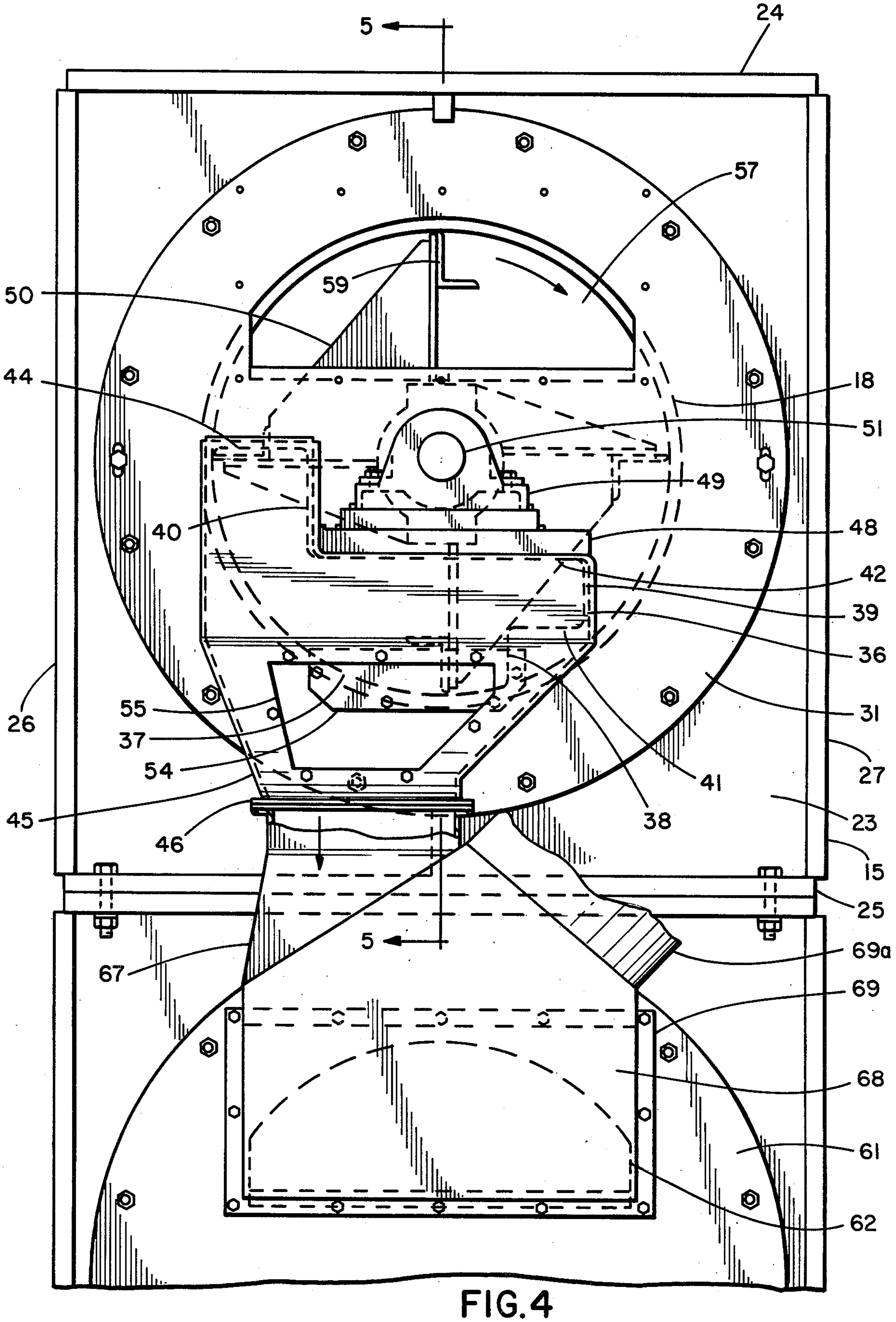
FIG. 4 is an enlarged elevation view similar to FIG. 2 of a discharge end of a chamber of the apparatus and a related chamber inlet.
Figure 5:
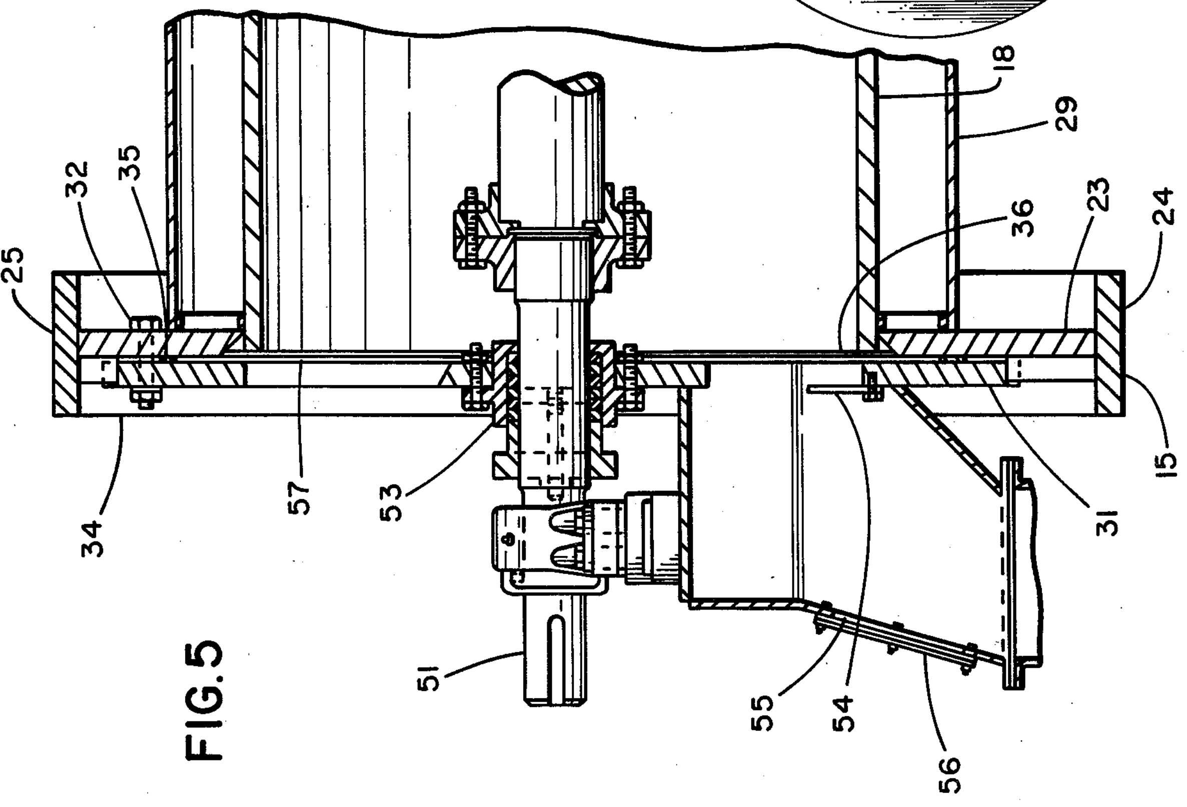
FIG. 5 is a sectional view taken along 5—5 of FIG. 4.

FIGS. 4 and 5 show on a larger scale, the discharge end of tube 18. Cover 31 is removably fastened to end plate 23 by bolts 32 and nuts 34 with a gasket 35 therebetween. Cover 31 (see FIG. 7) has an opening 36 therethrough in its bottom portion and thus in communication with the bottom portion of the tube or chamber. Opening 36 has a lower curved surface 37 that is generally aligned with the inner periphery of tube 18 and starts from a vertically extending surface 38 on one side of the vertical centerline of the tube and extends upwardly on a radius to above the horizontal centerline of the tube and on the opposite side of the vertical centerline thereby following the direction of rotation of the agitator. Vertical surfaces 38, 39, and 40, with essentially horizontal surfaces 41, 42, and 44 define a generally crescent shaped opening with a lower portion and an upper portion for the travel of rotatably agitated material to pass out of tube 18. Surrounding opening 36 and welded to cover 31 and thus forming a part thereof, is discharge chute 45. Chute 45 has a flanged surface 46 that is located generally on the same side of the cover and hence tube vertical centerline as upper section of opening 36 and as the later to be described inlet cover. Chute 45 also has a pad 48 on an exterior thereof for supporting pillow block bearing 49 for the agitator 50. Agitator 50 has a longitudinally extending shaft 51 which is sealingly located in cover 31 by a stuffing box type seal 53. Mounted on cover 31 adjacent the lowest part of opening 36 is adjustable dam or gate 54 which controls the flow of material through tube 18. Access to gate 54 is had through aperture 55 in chute 45 which is closed by cap 56 via suitable fasteners. Also a part of cover 31 is upper vent opening 57 located in the upper portion of cover 31. Shown in dotted lines in FIG. 4 and in solid lines in FIG. 1, is angle mount 59 of agitator 50. Each angle mount includes 4 spaced angles or paddle elements preferably extending parallel to shaft 51 when mounted on a supporting cluster which is keyed to shaft 51. The angles are located on the shaft depending upon its rotation. As shown in FIG. 4, the angles are designed to rotate down into the material to be rendered which on start up may to cover the lower quarter of the tube, and by centrifugal force maintain the material about the periphery of the tube. Some 4 spaced angle mounts are mounted on shaft 51 interspersed by 4 radially offset at preferably 45° but similar angle mounts 60. The angles of both angle mounts overlap longitudinally as shown in FIG. 1 which allows more angles (8) in the internal tube area. Due to the size of the material to be rendered, materials located in the clearance of the revolution between the angle and tube inner wall are compressed and thus moved longitudinally thereby assisting in the longitudinal travel of material through the tube which is particularly useful on discharge.

Figure 6:
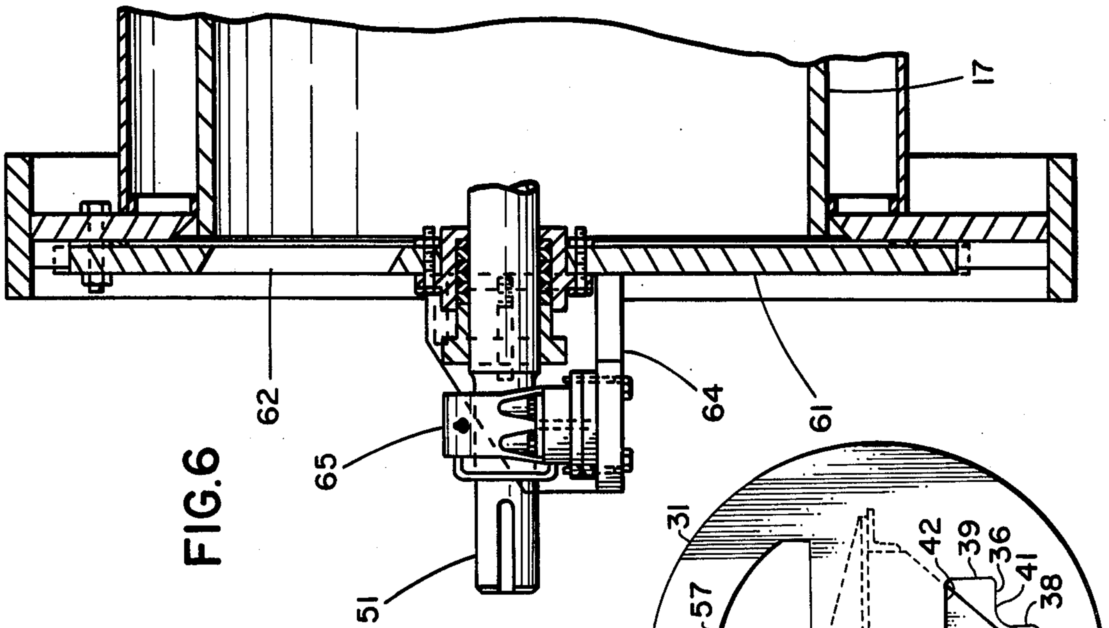
FIG. 6 is a sectional view similar to FIG. 5 but of an inlet end of a chamber.

Referring to FIG. 6, therein is shown cover 61, which defines the inlet for tube 17 and which is in communication with the discharge of tube 18. Cover 61 is closed in its bottom portion but has upper opening 62 which extends a substantial portion of the width of cover 61. Below opening 62 is support plate 64 attached to cover 61 and mounted thereon is pillow block bearing 65 for shaft 51 of agitator 50. A suitable stuffing box seal seals the shaft 51 where same extends through cover 61.

Figure 7:
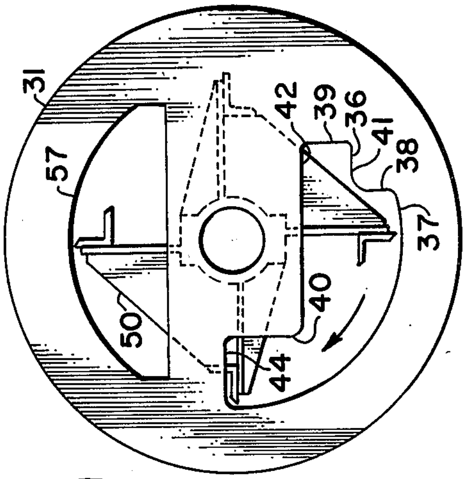
FIG. 7 is a view, similar to FIG. 4, of a discharge cover with the chute removed and the agitator for use therewith.

FIG. 7 is a partial detail view of the cover 31 depicted in FIGS. 4 and 5, but shown without the discharge chute 45. This figure more clearly illustrates the configuration of the openings 36 and 57 as well as the relation between the cover 31 and the agitator 50. The various elements identified in FIG. 7 are the same as corresponding elements elaborated in FIGS. 4 and 5.

As best shown in FIGS. 4 and 2, the material transition conduit 67 is attached to surface 46 of chute 45 of discharge cover 31 by suitable fasteners and extends downwardly to attach to vent transition 68 of cover 61.

Transition 68 is preferably a weldment made from 8 guage hot rolled steel. Transition 68 has a large rectangular flanged surface 69 that is constructed to enclose opening 62 of tube 17. Transition 68 also has an upper opening aligned with transition conduit 67 and located on the same side of the vertical centerline for tubes 17 and 18 and the balance of the tubes. Material can thus flow in the direction of the arrow through the transitions, which are welded together, vertically downward and enter into tube 17 through one side of opening 62. The other side of opening 62 is connected via vent portion **69*a* of transition 68 which extends away from tube 17 and has a flanged surface 70 which is adapted via fasteners to be connected to a vent system 71. Also connected to vent system 71 is vent transition 72 which is attached to discharge cover 31 and encompasses upper opening 57. Vent transition 72 is similar to transition 68 but does not have the opening for the material travel. Only venting is performed via opening 57**.

Figure 3:
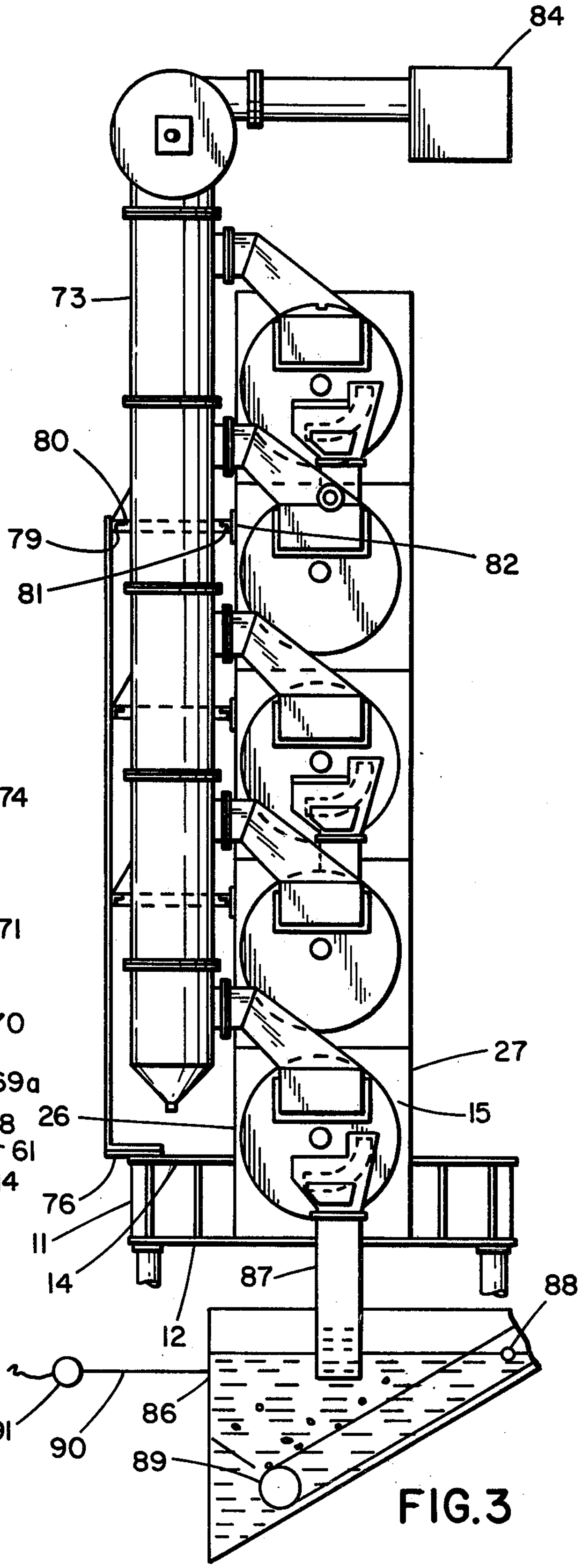
FIG. 3 is a side view (partially schematic) taken along line 3—3 of FIG. 1.

Vent system 71 for removing the product steam via the broken line arrows is shown best in FIGS. 1–3. Vent system 71 consists of dual vertical manifolds 73 and 74 with an upper horizontal manifold 75 connecting same. Each tube 17–21 is vented at both ends at the adjacent vertical manifold. As shown best in FIGS. 1 and 3, exemplary manifold 73 is supported on the apparatus 10 formed from the tubes by various structural members. One of the members, base plate 76 is attached by fasteners to support 11. Channel 78 is attached to base plate 76 and extends upwardly to a position short of tube 21 and is supported in the vertical position by angles 79, 80, and 81, with 81 welded to plate 82 which is bolted to reinforcing member 15. Angle 79 is bolted to channel 78, thereby connecting manifold 73 to the apparatus. Similar lower structural members also provide support to manifold 73. Manifold 74 is similarly supported on the other side of apparatus 10 with manifolds 73 and 74 supporting manifold 75 which is connected to conventional condenser 84.

Referring to FIG. 1, schematically shown therein, is a water containing stand pipe pump 85 connected to manifold 73 by a pipe as large in diameter as the raw feed pipe to collect solid carry over material and which also serves as a positive pressure relief and a vacuum relief. Manifold 74 is intended to have a similar stand pipe pump (not shown).

Also a part of the apparatus, and shown schematically in FIG. 3, is a suitable air lock to maintain the vacuum applied to the vent system while discharging fat and cracklings which is also of the standpipe variety. The standpipe arrangement includes a holding tank 86 extending below standpipe 87 connected to the discharge of lower tube 17. Tank 86 which has a drain 88, maintains a desired level of fluid fat therein that is above the lower end of the standpipe. A conveyor 89 is provided to move the solids from tank 86. A conventional add fat conduit 90 extending between holding tank 86 supplies fat as needed to opening 30 via an adjustable speed pump 91 to prevent high protein glue from sticking to the tube inner surfaces.

In operation, raw animal material is fed in an air free state into flanged opening **30*a* connected to tube 21 which is otherwise identical to tube 17 and is heated by jacket 29. Simultaneously via a vent portion, product steam is vented to manifold 74 connected via top manifold 75 to condenser 84. Agitator 50 rotating in a clockwise direction lifts the material from the tube bottom via angle mounts 59 and 60 and by centrifugal force throws same about the periphery of the inner tube circumference to be heated by the jacket. As the material continues to move into the tube, and due in part to the agitator action, the material moves in a spiral fashion through tube 21 toward the discharge end. The product steam, which occupies most of the tube volume, due to the agitator action and the vacuum, moves in a spiral fashion toward manifold 74 at the intake end and toward manifold 73 at the discharge end. At the discharge end of tube 21 (see FIG. 3) a certain amount of material is retained in the tube by the gate, thereby controlling the flow, and the balance moves down into tube 20 with simultaneous venting of steam to manifold 73. At this point it might be noted that the material held back by the dam is also being continuously removed to prevent overcooking. The material then moves sequentially through the length of the tubes down through the apparatus. It is to be noted that the discharge end of tube 21 is identical to discharge end of tube 18 except for hand and hence will be detailed in connection with tube 18**.

When the material reaches the discharge end of tube 18 as shown best in FIGS. 1, 4, and 5, gate 54 retains an amount of constantly renewed material in tube 18. The material is continually being moved about the periphery of the inner circumference of the tube. At the opening 36 in cover 31, (see FIG. 7) the material enters same and as the agitator advances also moves out the upper curved discharge portion of the opening via discharge chute 45 and transitions 67 and 68 into tube 17 on the same side of the centerline as chute 45. Simultaneously steam is vented from tube 18 via vent transiston 72 to vertical manifold 74. Also vent portion **69*a* conducts steam from tube 17 via the part of opening 62 (not occupied by material) into manifold 74. The material then moves to the discharge end of tube 17 where it leaves the tube while the air lock maintains the vacuum condition in the apparatus. At this end also, venting of product steam occurs to manifold 73**.

In a 5 tube apparatus as shown in FIG. 1 with each tube having dimensions of 36 inches O.D. and 34 inches I.D. with a length of 20 ft., 21,000 lbs. per hour of raw material were cooked with an evaporation rate of 11,700 lbs. per hour, which as mentioned previously represents double the output of 6–24 inches O.D. 22 inches I.D. 20 ft. long tubes with only a 53% increase in area.

Having thus described the invention, it will be clear to those skilled in the art that various changes and modifications can be made without departing from the spirit of the invention or the scope of the appended claims.

I claim:

1. A continuous rendering apparatus of the type comprising: a plurality of generally horizontal cylinders having opposed end walls and arranged one above the other, connection means intercoupling the discharge end of each cylinder and the entry end of the cylinder therebeneath, the discharge end of each cylinder being adjacent the entry end of the cylinder therebeneath, whereby the material to be rendered passes sequentially and downwardly through said cylinders, heating means for heating each cylinder, elongated agitator means rotatably positioned in each cylinder for moving the material about the inner circumference of each cylinder, vent means from each cylinder for venting the vaporized moisture, vacuum means connected to each of said vent means for creating a vacuum in each of said cylinders, and seal means connected to a discharge pipe of the lowest cylinder for preserving the vacuum in said cylinders, wherein the improvement comprises: said connection means including a discharge opening in the exit end wall of each cylinder, an inlet opening in the entry end wall of the cylinder therebeneath, and a discharge chute for each discharge opening, each chute extending beyond the ends of said cylinders and intercoupling a respective discharge opening with the inlet opening therebelow; said discharge opening being generally L-shaped and having a curved surface extending only along a portion of the lower half of the cylinder and generaly aligned with the inner periphery thereof and said opening extending over only a portion of the lower half of said cylinder with its highest point being on said curved surface in the direction of rotation of said agitator means.

2. A continuous rendering apparatus of the type comprising: a plurality of generally horizontal cylinders having opposed end walls and arranged one above the other, connection means intercoupling the discharge end of each cylinder and the entry end of the cylinder therebeneath, the discharge end of each cylinder being adjacent the entry end of the cylinder therebeneath, whereby the material to be rendered passes sequentially and downwardly through said cylinders, heating means for heating each cylinder, elongated agitator means rotatably positioned in each cylinder for moving the material about the inner circumference of each cylinder, vent means from each cylinder for venting the vaporized moisture, vacuum means connected to each of said vent means for creating a vacuum in each of said cylinders, and seal means connected to a discharge pipe of the lowest cylinder for preserving the vacuum in said cylinders, wherein the improvement comprises: said connection means including a discharge opening in the exit end wall of each cylinder, an inlet opening in the entry end wall of the cylinder therebeneath, and a discharge chute for each discharge opening, each chute extending beyond the ends of said cylinders and intercoupling a respective discharge opening with the inlet opening therebelow; said discharge opening having a curved surface extending only along a portion of the lower half of the cylinder and generally aligned with the inner periphery thereof and said opening extending over only a portion of the lower half of said cylinder with its highest point being on said curved surface in the direction of rotation of said agitator means; said opening being generally L-shaped with a generally vertical leg and a generally horizontal leg, said generally vertical leg extending upwardly along said curved surface to a point approximately on the horizontal diameter of said cylinder, said generally horizontal leg extending from the bottom of said vertical leg away from said curved surface a distance less than the full diameter of said cylinder.

3. The apparatus of claim 2 in which each of said agitator means comprises: a shaft located in a cylinder and rotatably mounted on the exterior of the cylinder end walls, said shaft having a plurality of paddle elements mounted thereon located inside and extending substantially the full length of the cylinder.

4. The apparatus of claim 3 in which said plurality of paddle elements are located generally parallel to said shaft and consist of clusters of paddle elements longitudinally spaced along said shaft and connected to said shaft at radially spaced intervals with the paddles of one cluster overlapping another longitudinally.

5. The apparatus of claim 4 in which said cylinder end walls are removable covers and the heating means is a steam jacket that surrounds and extends substantially the entire length of each cylinder.

6. The apparatus of claim 5 further comprising a gate removably located in each discharge for controlling the flow of material through each cylinder.

7. Apparatus according to claim 2 in which vent means are located in both ends of each cylinder.

8. Apparatus according to claim 7 in which each inlet opening of each cylinder is located in the upper portion of the entry end wall and each vent means at the entry end is located in the upper portion of the entry end wall in spaced relationship to said inlet opening.

* * * * *

UNITED STATES PATENT OFFICE

CERTIFICATE OF CORRECTION

PATENT NO. : 4,166,836

DATED : September 4, 1979

INVENTOR(S) : John H. Pikel

It is certified that error appears in the above-identified patent and that said Letters Patent are hereby corrected as shown below:

IN THE CLAIMS:

Claim 8, line 5, change the word "said" to read --the--.

Signed and Sealed this

*Fifth* Day of *February 1980*

[SEAL]

*Attest:*

SIDNEY A. DIAMOND

*Attesting Officer* *Commissioner of Patents and Trademarks*